Jan. 19, 1965
J. W. HICKS, JR
3,166,395
METHODS OF MAKING FIBER OPTICAL DEVICES
Original Filed June 3, 1958
2 Sheets-Sheet 1
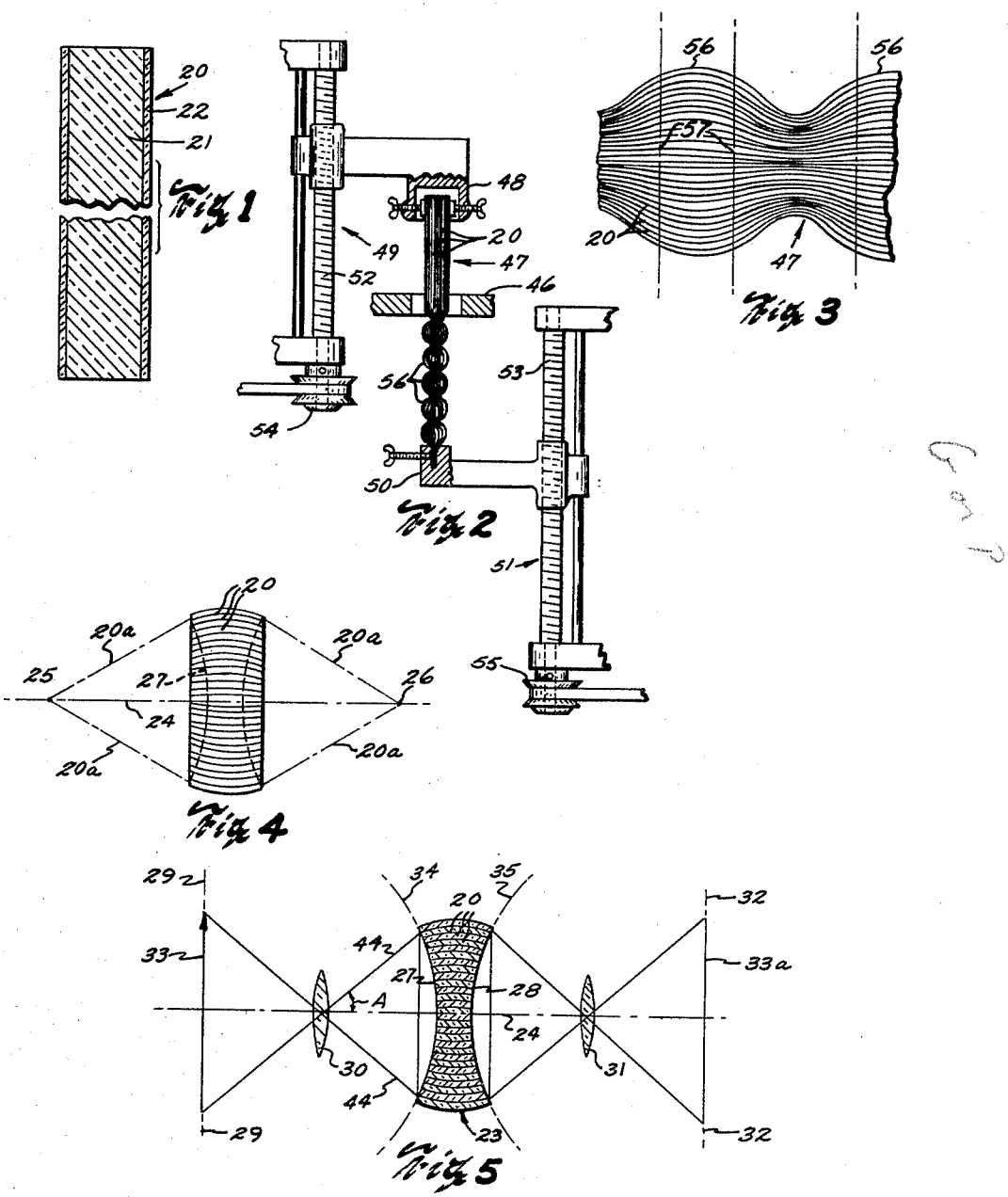
INVENTOR
JOHN W. HICKS, JR.
BY James P. McAndrews
ATTORNEY Jan. 19, 1965   J. W. HICKS, JR   3,166,395
METHODS OF MAKING FIBER OPTICAL DEVICES
Original Filed June 3, 1958   2 Sheets-Sheet 2

INVENTOR
JOHN W. HICKS, JR.
BY *James P. McAndrews*
ATTORNEY

United States Patent Office 3,166,395
Patented Jan. 19, 1965

3,166,395
METHODS OF MAKING FIBER OPTICAL DEVICES
John W. Hicks, Jr., Fiskdale, Mass., assignor to American Optical Company, Southbridge, Mass., a voluntary association of Massachusetts
Original application June 3, 1958, Ser. No. 739,535, now Patent No. 3,033,071, dated June 8, 1962. Divided and this application July 13, 1961, Ser. No. 130,450
6 Claims. (Cl. 65—4)

This invention relates to fiber optical devices and has particular reference to improved fiber optical means for transferring optical images from one location to another and method of making the same.

This application is a division of applicant's copending application, Serial No. 739,535, filed June 3, 1958, now U.S. Patent No. 3,033,071.

In conventional optical systems which embody optical lenses or various components formed of lenses or the like, there exists the well-known problem of attempting to correct or compensate for the curvature of field which inherently occurs in the image field produced by such lenses or components.

When relaying optical images along an extended optical path through a system embodying more than one optical component, the inherent curvature of field produced by each of said components is accumulatively increased as the image is passed from one component to the other with the result that at the image surface of the system, an extreme curvature of field may result. In instances where the images are to be ultimately received by flat screens or the like or converted in a well-known manner into photographs, various parts of the image areas which do not lie on said screen or the like due to the curvature of the image surfaces of the systems, are received at said screens in an out-of-focus condition. Consequently, considerable deterioration of the finally formed images or photographs results from the above-mentioned curvature of field.

Heretofore, it has been the practice to provide complex field lenses in conventional optical systems and/or to provide corrective curvatures directly on the optical components of the systems in an attempt to overcome the effects of field curvature common to such systems.

In addition to being complex, difficult and expensive to manufacture, conventional field-flatteners or field-flattening techniques have met with only limited degrees of success since the problem of producing a substantial flattening of the image fields of conventional optical components without altering the desired optical characteristics of said components has been practically insurmountable.

The present invention provides novel means and method for overcoming the above-mentioned problems and it is, accordingly, a primary object of the invention to provide simple, efficient and economical means and method for flattening the inherently curved image fields of conventional optical components and/or systems.

Another object is to provide compact and highly efficient field-flattening means which is readily adaptable for use in conventional optical systems.

Another object is to provide a fiber optical field-flattener which is adapted to receive, transfer and simultaneously accurately flatten optical images which are initially disposed in a curved image field.

Another object is to provide a fiber optical field-flattener of the above character for transferring and flattening curved optical images without introducing any substantial deterioration in the contrast, definition or relative positional arrangement of the component parts of said image.

Another object is to provide optical image field-flattening and transferring means embodying a multiplicity of intimately bundled light-conducting fibers so arranged relative to each other as to accurately receive, transfer and simultaneously flatten curved optical images.

Another object is to provide field-flattening means of the above character which is adapted to transfer substantially all of the light received thereby from a first predetermined image plane, directly to a second predetermined image plane.

Other objects and advantages of the invention will become apparent from the following description when taken in conjunction with the accompanying drawings in which:

FIG. 1 is a greatly enlarged longitudinal cross-sectional view of a light-conducting fiber of the type which is used in the manufacture of the fiber optical devices of the invention;

FIG. 2 is a diagrammatic illustration of means for forming a fiber optical structure from which devices of the character of the invention are formed;

FIG. 3 is an enlarged fragmentary side elevational view of the fiber optical structure illustrated in FIG. 2 wherein there is illustrated between the dot-dash lines a selected portion of said structure from which devices of the character of the invention are formed;

FIG. 4 is a side elevational view of one form of the device of the invention;

FIG. 5 is a diagrammatic illustration of an optical system embodying the device of the invention;

Referring more particularly to the drawings wherein like characters of reference designate like parts throughout the several views, there is shown in FIG. 1 a greatly enlarged cross-sectional view of a light-conducting fiber 20 of the type used in the fabrication of the devices of the invention. The fiber 20 comprises a core part 21 of light-conducting material such as glass, plastic or the like which is of a relatively high index of refraction and an outer relatively thin coating or cladding 22 of glass or plastic material of relatively low index of refraction. Fibers such as shown in FIG. 1 may be formed by various known techniques such as, for example, the heating and drawing of a precoated rod of light-conducting material or, alternatively, an uncoated rod of light-conducting material may be heated and drawn to form a fiber which is subsequently coated with a suitable cladding material.

Figure 6:
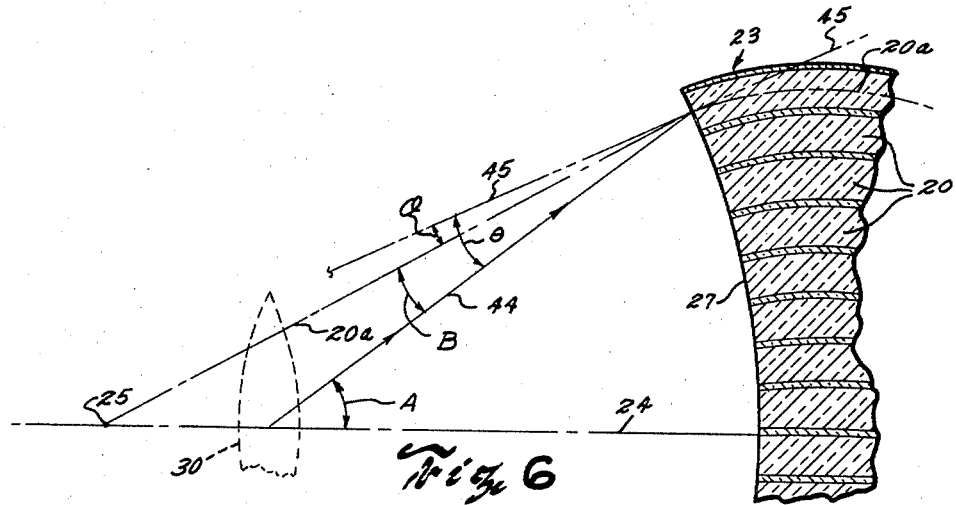
FIG. 6 is a greatly enlarged fragmentary cross-sectional view of the device of the invention wherein there is diagrammatically illustrated a path along which light is conducted through one of the light-conducting fibers of said device.

One form of the device 23 of the invention (see FIGS. 4 and 6) which comprises a multiplicity of light-conducting fibers 20 in accurately aligned side-by-side connected relation with each other is formed, in a manner to be described in detail hereinafter, so as to cause the longitudinal axes 20a of the fibers 20 to be in convergent relation with each other and thus intersect the points 25 and 26 (FIG. 4) along a central axis 24 through said device. Furthermore, the opposite sides or faces 27 and 28 of the device 23 are concavely shaped in accordance with the optical characteristics of the optical system in which the device 23 is intended to be used.

As stated hereinabove, the device of the invention is designed to function as field-flattening means when incorporated in an optical system. Therefore, the device 23 must be constructed in accordance with the optical characteristics of the particular optical elements of the system in which it is to be used.

For purposes of illustration, a simple optical system is diagrammatically shown in FIG. 5 which embodies a flat object plane 29, an objective lens 30, field-flattener 23, an imaging lens 31, which is identical to lens 30, and an image plane 32. An image of a flat object, illustrated by arrow 33, is produced by the objective lens 30 at its image surface or image field 34 which is curved in accordance with the optical characteristics of the lens 30. The inherent curvature of field 34 of the lens 30 is calculated in a well-known manner and the face 27 of the field-flattener 23 is provided with a curvature matching that of the field curvature 34 of the lens 30. Thus, by placing the face 27 of the field-flattener 23 in coincident relation with the image field 34 of the lens 30, as illustrated, all parts of the image of arrow 33 are accurately received by the field-flattener 23 and transferred through its fiber optical components to its opposite face 28 which is provided with a curvature identical to that of face 27. Upon exiting from the field-flattener 23, it can be seen that the image of arrow 33 will be provided with a curvature illustrated by dot-dash line 35 which is characteristically identical to the curvature illustrated by dot-dash line 34 but reversed in its direction of cupping. Thus, with the lens 31 being axially spaced from the field-flattener 23 at a distance equal to the distance between the lens 30 and field-flattener 23, the lens 31 will receive the image of arrow 33 from the face 28 of the field-flattener 23 and reform the image at the flat image plane 32 of the system as illustrated. Due to the fact that the lens 31 is identical in character to the lens 30, it will produce a flat image from an object which is curved in accordance with its field curvature characteristics. In the system illustrated, the object for the lens 31 is the curved image produced at the face 28 of the field-flattener and the face 28 is, as stated above, curved in accordance with the field curvature characteristics of the lens 31.

With a system such as shown in FIG. 5, which incorporates the field-flattener 23, a flat object 33 will be imaged precisely in focus as a flat image 33a at the image plane 32 of the system. If, however, the field-flattener 23 was not used in the system of FIG. 5, obviously, the curvature of field produced by both of the lenses 30 and 31 would accumulatively cause the image 33a of the arrow 33 to be received curved at the location of plane 32 with its opposite ends out of focus relative to said plane 32.

It should be understood that in optical systems where the objective lens 30 and the imaging lens 31 are not characteristically identical, the face 27 of the field-flattener would be provided with a curvature simulating that of the curvature of field produced by the lens 30 and the face 28 of the field-flattener 23 would be provided with a curvature simulating that of the field curvature which would be produced by the lens 31. Furthermore, the distances between the lenses 30 and 31 and their respective faces 27 and 28 of the field-flattener 23 would be controlled in accordance with the focal lengths of the lenses 30 and 31.

Another important feature of the present invention is, as mentioned above, that of constructing the field-flattener 23 in such a manner as to cause substantially all of the image-forming light which is transferred by the lens 30 to be received by the light entrance end or face 27 of the field-flattener 23 and be directionally emitted from its light exit end or face 28 in such a manner as to cause substantially all of said original image-forming light to be received and re-imaged by the lens 31 thus avoiding the effects of poor intensity and contrast in the image finally formed by the lens 31 which would normally result from portions of said light being strayed away from the lens 31.

In order to produce this directional effect on the light received and emitted by the field-flattener 23, its fibers 20 are so arcuately shaped as to cause their longitudinal axes to be in convergent relation with each other at their light entrance and exit ends and thus intersect each other at points 25 and 26 (FIG. 4) in the manner discussed hereinabove.

Figure 8:
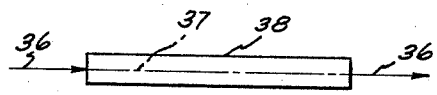
FIGS. 8, 9 and 10 are diagrammatic illustrations of different light-conducting fibers which have been shown to demonstrate the behavior of light passing through the same.
Figure 10:
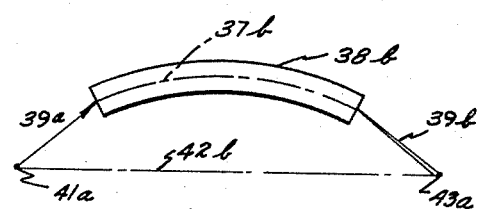
Figure 9:
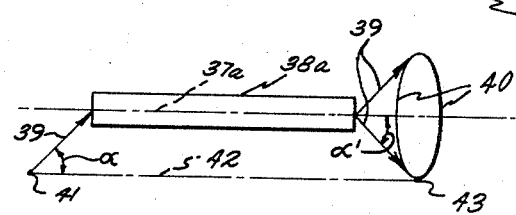

With a view to more clearly understanding the reasons for so arcuately shaping the fibers 20 of the field-flattener 23, there is shown in FIGS. 8, 9 and 10, diagrammatic illustrations of the light-conducting characteristics of different light-conducting fibers.

Referring more particularly to FIG. 8, it can be seen that light 36 which enters along the longitudinal axis 37 of a straight fiber 38 will be transferred through the fiber 38 and emitted at the exit end of said fiber also along its axis 36. However, light 39 (FIG. 9) entering the face of a straight fiber 38a at an oblique angle α will be conducted through the fiber 38 by a well-known principle of internal reflection common to transilluminators of this type and while traveling through the fiber 38 will "lose memory" of its initial azimuthal angle and become spread out or decollimated in respect to its azimuthal angle and will emerge from the fiber in the form of an annulus of a cone 40 having a half cone angle α' equal to the angle. Thus, it can be seen that only a small portion of the light 39 emanating from a point source 41 on an axis 42 which is in offset relation with the axis 37a of the fiber 38a will be received at the point 43 on axis 42. In instances where lenses or the like may be located at points 41 and 43, a lens at point 43 might receive only a portion of the light which is transferred through the fiber 38 since other portions of said light which form the conical annulus 40 are mis-directed as stray light away from the point 43.

In order to overcome the adverse effects caused by such a loss in light energy, a fiber may be arcuately shaped, as shown in FIG. 10, so as to cause light 39a from point 41a on an axis 42b in offset relation to the axis 37b of the fiber 38b to enter the fiber 38b in a direction substantially along or in line with its longitudinal axis 37b and be directionally emitted from the exit end of the fiber 38b so as to be substantially totally received at point 43a. Actually, the light 39a which has entered the fiber 38b will be slightly decollimated and amount in accordance with the diameter and the extent of curvature of the fiber 38b (smaller radii of curvature and larger diameter fibers producing greater amounts of decollimation) and the light emerging from the fiber will spread out to fill only a relatively very small cone 39b which, for practical purposes, may be considered to be light emerging along the axis 37b of the fiber 38b. In effect, the fiber of FIG. 10 functions in much the same manner as the straight fiber illustrated in FIG. 8.

It is pointed out that while the above examples of different light-conducting fibers have referred more particularly to fibers which are circular in cross-sectional shape, light passing through fibers having different cross-sectional configurations will behave in a similar fashion. Therefore, fibers of any desired cross-sectional shape may be used to form the device of the invention.

It should be understood, however, that due to the differences in indices of refraction of air and the light-conducting material of the fiber 38, the arcuate curvature of the axis 37 of a fiber 38 such as shown in FIG. 10 must be accurately controlled in accordance with said indices of refraction so as to cause the light 39 striking the entrance face of the fiber to be directed, upon entering the fiber, along its axis 37.

Referring again to FIG. 5 as an example of an optical system embodying a field-flattener 23, the field-flattener 23 is constructed in accordance with the optical characteristics of the lenses 30 and 31 in the following manner:

The curvatures of fields 34 and 35 for the lenses 30 and 31 respectively, are first calculated in a well-known manner common to lens design techniques and the axial distances from the lenses 30 and 31 to their fields 34 and 35 are also determined. Knowing the outer diameter or size to which the field-flattener 23 is to be made, the angle A between the outermost rays of light 44 which will be accepted by the field-flattener 23 and a central axis 24 through the system of FIG. 5, is determined (see FIGS. 5 and 6). From Snell's law, the proper angles of approach of the axes 20a of fibers 20 to the image surfaces or fields 34 and 35 for the outermost fibers of the field-flattener 23 are calculated.

Where $N=$ the index of refraction of the material of the core parts 21 of the fibers 20, $\theta=$ the angle between the incident ray of light 44 and a normal 45 to the face of the fiber 20 and $\varphi=$ the angle between the normal 45 to the face of the fiber and the longitudinal axis 20a of the fiber 20 (see FIG. 6) the calculations are as follows:

$$\sin \theta = N \sin \varphi \text{ and } \sin \varphi = \frac{\sin \theta}{N}$$

Having thus calculated the angle $\theta$ of approach for the ray of light 44 relative to a normal 45 to the face of the fibers 20 and the angle $\varphi$ which gives the angle between the normal 45 to the face of the fibers and its longitudinal axis 20a, it can be seen that $\theta$ minus $\varphi$ will give the angle B between the axis 20a and the ray of light 44. The field-flattener 23 is then constructed by forming an array of substantially straight light-conducting fibers 20 in connected side-by-side parallel relation with each other and suspending the same through an annular heating element 46 (FIG. 2) to be drawn in the manner illustrated. The bundle 47 of fibers 20 is rigidly secured at its upper end within a chuck 48 which is directly connected to a first positive drive mechanism 49 adapted to lower the bundle 47 through the heating element 46 at a predetermined rate. The lower end of the bundle 47 is gripped by a clamp member 50 which is rigidly connected to a second positive drive mechanism 51 and each of the mechanisms 49 and 51 which embody lead screws 52 and 53 respectively are driven by belt and pulley arrangements or the like 54 and 55 which are, in turn, each connected to suitable sources of motivating power, not shown. By operating the lead screws 52 and 53 at predetermined rates, the chuck 48 and clamp 50 may be moved toward or away from each other while the fiber optical bundle 47 is simultaneously gradually lowered through the heating element 46.

In order to form a fiber optical structure embodying a plurality of necked-down sections 56 (see FIGS. 2 and 3) from which field-flatteners of the character of the invention are formed, the drive mechanisms are operated at predetermined rates which cooperatively function to gradually lower the fiber bundle 47 through the heating element 46 while at the same time causing varied rates of drawing on the bundle 47 to form the necked-down sections 56.

By proper control of the varied rates at which the bundle is drawn in accordance with the desired calculated angles discussed above, the outermost fibers of the bundle 47 thereof will be so arcuately shaped at the mid-sections of the necked-down portion 56 as to have their longitudinal axes disposed along arcuate paths of a predetermined curvature such as to properly receive and transfer light rays when the mid-sections of the necked-down portions 56 are formed into field-flatteners in a manner to be presently described. By drawing the bundle 47 to provide the outermost fibers thereof with the calculated axial directions, the innermost fibers of the bundle will be automatically arcuately formed so as to cause their longitudinal axes to intersect each other at common points along a central axis through the bundle 47.

Having thus formed the necked-down portions 56, the mid-sections of said portions 56 are removed from the bundle 47 by cutting the portions 56 along the dot-dash lines 57 (FIG. 3). Each of the mid-sections of the necked-down portions 56 are next finished by grinding and optically polishing their opposite face parts to curvatures simulating the curvatures of fields 34 and 35 which are produced by the respective lenses 30 and 31. In this manner, the face parts of the mid-sections become the light-receiving and exit faces 27 and 28 respectively of the field-flattener 23 thus formed. It is pointed out that the angles of approach of the ends of the fibers 20 relative to the faces 27 and 28 and the curvatures provided on the faces 27 and 28 of the field-flattener 23 are formed in accordance with the curvatures of field which are produced by the lenses 30 and 31 of the particular optical system in which the field-flattener is used and it should be understood that the system described hereinabove is given only by way of illustration. That is, the lenses 30 and 31 need not have identical optical characteristics as described.

Figure 7:
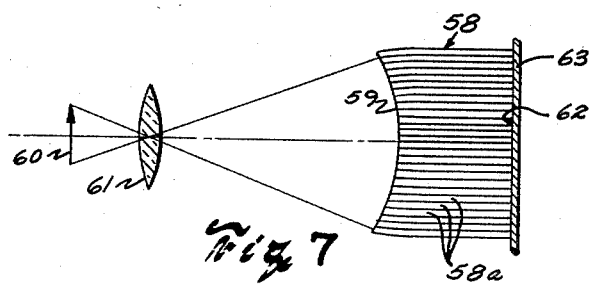
FIG. 7 is a diagrammatic illustration of an optical system in which there is incorporated a modified form of the device of the invention.

A modified form of the device of the invention is illustrated in FIG. 7 wherein there is shown a field-flattener 58 which is adapted to receive at its light entrance face 59, an image of an object, illustrated by arrow 60, which is formed by an objective lens 61. Upon receiving the image of the object 60, the field-flattener 58 will function to transfer the image to its light exit end or face 62 which is formed flat as shown. The light entrance face 59 of the field-flattener 58 is formed to a curvature simulating the curvature of field which is produced by the objective lens 61 and the face 59 is positioned so as to be in coincidently aligned relation with the image field of the lens 61. The angle of approach of the light-conducting fibers 58a of the field-flattener 58 and the curvature of its light-entrance face 59 are formed in the manner disclosed above with reference to the forming of the face 27 of the field-flattener 23. The light exit end or face 62, however, is formed flat as illustrated and consequently the fibers 58a approach the face 62 in a direction normal to said face 62. By providing image-receiving means such as photographic film material 63 or the like in direct contact with the face 62, images which are produced by the objective lens 61 are received by the face 59 and transferred through the individual light-conducting fibers 58a to the flat face 62 whereupon, said image becomes flattened by the field-flattener 58 and accurately received in focus by the flat film material or the like 63.

The field-flattener 58, is, of course, initially formed by necking-down only one end of a bundle of fibers such as shown at 47 in FIG. 2 rather than providing the portions 56 which are necked-down at both of their ends.

It should be understood that image-receiving means other than the film material 63 may be used to receive images transferred by the field-flattener 58. For example, a diffusing screen or the like may replace the film 63 to provide means for viewing the image received at the light exit end or face 62 or, alternatively, optical means may be used to receive the image and direct the same to a location remote from the field-flattener 58.

It is also pointed out that the cross-sectional size of the individual fibers used to form the field-flatteners of the invention would be selected in accordance with the degree of resolution desired of the image which is transferred through the field-flatteners since, it is a well-known fact that the image-resolving power of all fiber optical devices is dependent upon the number and cross-sectional size of the individual light-conducting fibers which make up such devices. Smaller fibers in greater numbers per unit of cross-sectional area produce the higher degrees of resolving power in fiber optical devices.

From the foregoing, it can be seen that simple, efficient and economical means and method have been provided for accomplishing all of the objects and advantages of the invention. Nevertheless, it is apparent that many changes in the details of construction, arrangement of parts or steps in the method may be made without departing from the spirit of the invention as expressed in the accompanying claims and the invention is not limited to the exact matters shown and described as only the preferred matters have been given by way of illustration.

Having described my invention, I claim:

1. The method of making a fiber optical device of the character described for use in an optical system having at least one optical image-forming component having a known focal distance and curvature of field, said method comprising, forming an assembly of intimately bundled light-conducting fibers in side-by-side connected relation with each other and having at least one section of said assembly necked down so that the longitudinal axes of said fibers in said section are oriented to converge at a common point spaced from said section at a distance substantially corresponding to said focal distance of said optical component, cutting transversely through said section of said assembly to form a first face part thereon, optically finishing said first face part to a curvature corresponding to said known curvature of field of said optical component, and optically finishing a second face part at the end of said assembly opposite to said first face part.

2. The method of making a fiber optical device of the character described for use in an optical system having a pair of optical image-forming components each having a known focal distance and curvature of field, said method comprising, forming an assembly of intimately bundled light-conducting fibers in side-by-side connected relation with each other and having a predetermined section of said assembly necked down at each of its opposite sides so that the longitudinal axes of said fibers in each section are oriented to converge at a common point spaced from the section at a distance substantially corresponding to the focal distance of a respective optical component, cutting transversely through said sections to form face parts, one at each of its opposite sides, and optically finishing each of said face parts to curvatures corresponding to said known curvatures of field of said respective optical components.

3. The method of making a fiber optical device of the character described for use in an optical system having an optical image-forming component of known focal distance and curvature of field, said method comprising, forming an assembly of intimately bundled light-conducting fibers in side-by-side connected relation with each other and having one section of said assembly necked down so that the longitudinal axes of said fibers throughout said section are oriented to converge at a common point spaced from said section at a distance substantially corresponding to said focal distance of said optical component, cutting transversely through said section of said assembly to form a first face part thereon, optically finishing said first face part to a curvature corresponding to said known curvature of field of said optical component, and optically finishing a second flat face part at the end of said assembly opposite to said first face part with the plane of said second face part disposed in substantially normal relation to the axes of the portions of said fibers which are adjacent thereto.

4. The method of making a fiber optical device of the character described for use in an optical system having at least one optical image-forming component having a known focal distance and curvature of field, said method comprising, assembling a multiplicity of substantially straight light-conducting fibers in connected side-by-side bundled relation with each other, heating and drawing said assembly longitudinally at predetermined rates to form at least one necked down section in said assembly wherein the longitudinal axes of said fibers are oriented to converge at a common point spaced from said section at a distance substantially corresponding to said focal distance of said optical component, cutting transversely through said section of said assembly to form a first face part thereon, optically finishing said first face part to a curvature corresponding to said known curvature of field of said optical component, and optically finishing a second face part at the end of said assembly opposite to said first face part.

5. The method of making a fiber optical device of the character described for use with an optical system having a pair of optical image forming components of known focal distances and curvatures of field, said method comprising, assembling a multiplicity of substantially straight light-conducting fibers in connected side-by-side bundled relation with each other, heating and drawing said assembly longitudinally at predetermined rates to form sections at opposite ends of said assembly which are necked down so that the longitudinal axes of said fibers in each section are oriented to converge at a common point spaced from said section at a distance substantially corresponding to the focal distance of a respective optical component, cutting transversely through said section at each side of its center to form face parts thereon, optically finishing one of said face parts to a curvature simulating that of the curvature of image field produced by one of said components and optically finishing the other of said face parts to a curvature simulating that of the curvature of field produced by the other of said components.

6. The method of making a fiber optical device of the character described for use with an optical system having at least one optical image forming component of known focal distance and curvature of field, said method comprising, assembling a multiplicity of substantially straight light-conducting fibers in connected side-by-side bundled relation with each other, heating and drawing said assembly longitudinally at predetermined rates to form a necked down section at one end of said assembly wherein the longitudinal axes of said fibers in said section are oriented to converge at a common point spaced from said section at a distance substantially corresponding to the focal distance of said optical component, cutting transversely through said section of said assembly to form a first face part thereon, optically finishing said first face part to a curvature simulating that of the curvature of image field produced by said component and optically finishing a second flat face part at the other end of said assembly with the plane of said second face part disposed in substantially normal relation to the direction of the longitudinal axes of said fibers.

References Cited in the file of this patent

UNITED STATES PATENTS

| 2,608,722 | Stuetzer | Sept. 2, 1952 |
| 2,992,516 | Norton | July 18, 1961 |
| 2,995,970 | Hicks et al. | Aug. 15, 1961 |

OTHER REFERENCES

Kapany et al.: "Field Flatteners," Journal of the Optical Society of America, vol. 47, No. 7, July 1957, pages 594–598 relied on.